United States Patent
Ishii et al.

(10) Patent No.: US 7,783,166 B1
(45) Date of Patent: Aug. 24, 2010

(54) RECORDING MEDIUM, AND SYSTEM AND METHOD FOR RECORDING AND REPRODUCING THE RECORDING MEDIUM

(75) Inventors: Hidehiro Ishii, Saitama-ken (JP); Tadashi Noguchi, Saitama-ken (JP); Toshiro Tanikawa, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/490,114

(22) Filed: Jan. 24, 2000

(30) Foreign Application Priority Data

Jan. 26, 1999 (JP) .................................. 11-016838

(51) Int. Cl.
*H04N 7/00* (2006.01)
*H04N 7/26* (2006.01)

(52) U.S. Cl. .......................... 386/109; 386/46

(58) Field of Classification Search ................ 386/109, 386/111, 112, 27, 33, 125, 126, 96, 104, 386/105, 106, 45, 39, 46, 124, 40
See application file for complete search history.

(56) References Cited

U.S. PATENT DOCUMENTS

| | | | |
|---|---|---|---|
| 5,576,758 A * | 11/1996 | Arai et al. ................. | 348/220.1 |
| 6,532,336 B2 * | 3/2003 | Maruyama et al. ............ | 386/95 |
| 2004/0170393 A1 * | 9/2004 | Heo ........................... | 386/96 |

FOREIGN PATENT DOCUMENTS

| EP | 0 730 272 A2 | 9/1996 |
|---|---|---|
| EP | 0 737 980 A2 | 10/1996 |
| EP | 0 738 899 A1 | 10/1996 |
| EP | 0 808 072 A2 | 11/1997 |
| EP | 0 847 196 A1 | 6/1998 |
| EP | 0 872 839 A2 | 10/1998 |

* cited by examiner

*Primary Examiner*—Robert Chevalier
(74) *Attorney, Agent, or Firm*—Drinker Biddle & Reath LLP (57) ABSTRACT

A recording medium has a first recording area on which recording information is recorded, and a second recording area on which management information for managing the recording information is recorded. The second recording area includes a bit rate recording area for recording a bit rate.

3 Claims, 7 Drawing Sheets

RECORDING MEDIUM, AND SYSTEM AND METHOD FOR RECORDING AND REPRODUCING THE RECORDING MEDIUM

BACKGROUND OF THE INVENTION

The present invention relates to a recording medium, and a system and a method for recording and reproducing the recording medium, and more particularly to a recording medium having a logical data structure for editing recorded information.

There has been known the DVD-Video, which is an optical read-only disc capable of storing high-quality video information and audio information. The DVD-Video records information based on a specific logical data structure so as to be applied in an extensive field and to have various functions enabling various interactive reproduction thereof.

In accordance with the logical data structure, which is disclosed in known documents, the DVD-Video comprises a lead-in area at the inner end portion of the disc, lead-out area at the outer end portion, and a data recording area between the lead-in and lead-out areas wherein a plurality of data files are stored.

The data which is recorded in the data recording area can be roughly divided into presentation data to be reproduced and navigation data for controlling the reproduction. The navigation data includes attribute of the presentation data and control data necessary for the reproduction. There are five navigation data, which are video manager information (VMGI), video title set information (VTSI), program chain information (PGCI), presentation control information (PCI), and data search information (DSI).

The presentation data comprises video data, audio data and subpicture data which are integrated together with apart of the navigation data in accordance with the MPEG 2 standard (ISO 13818-1).

The video data has one stream of data compressed in accordance with the MPEG 2 video format (ISO 13818-2). The audio data take up a maximum of eight streams and comply with in one of the linear PCM, AC-3 and MPEG audio standards.

The subpicture data are data compressed in accordance with the run-length coding for enabling menus, and credits and words in the case of movies and karaoke system to be displayed over the main image, and take up a maximum of 32 streams.

These video data, audio data, and subpicture data are aggregated into sets in pack unit so as to form a bit stream multiplexed in plurality of pack units, thereby forming the presentation data.

The presentation control information (PCI) and data search information (DSI) are added to each of the video data, audio data and subpicture data to form a video object unit (VOBU).

The presentation control information (PCI) is provided for determining the reproduction information in accordance with the condition of the presentation data. The data search information (DSI) relates to fast forward and rearward reproductions and continual reproduction.

A plurality of video object units (VOBU) form a cell (CELL), and a plurality of cells (CELL) form a video object (VOB), and a plurality of video objects (VOB) form a video object set (VOBS).

The video title set information (VTSI) and the program chain information (PGCI) are added to one or more video object set (VOBS) to form a video title set (VTS). A plurality of video title sets (VTS) are recorded sequentially after control data called video manager (VMG) having video manager information (VMGI).

The video title set information has attribute information of the video object set (VOBS) in the video title set (VTS). The program chain information (PGCI) has information on reproducing order of the presentation data in the form of information on order of the cells (CELL). The video manager information (VMGI) has information on the directory of the video title set (VTS).

The reproduction of the presentation data is controlled in accordance with the information of the navigation data so as to enable the interactive reproduction.

The DVD-RW (rewritable) has also become to attract attention in addition to the DVD-Video. The DVD-RW belongs to the same so-called DVD family including the DVD-Video, and has the physical compatibility therewith. Since the DVD-RW is capable of recording, reproducing, erasing and rewriting information, it is a recording medium extremely suitable to the user for producing or authoring a desirable multimedia title.

A method called after recording is frequently used to produce such a multimedia title. In accordance with the after recording, the video data is recorded beforehand, and audio data such as voice, music, and sound effects are later recorded, new audio data are added to the previously recorded audio data or the recorded audio data are rewritten. Hence the operations for editing the titles are facilitated.

However, the user must carry out the after recording operation while confirming that the audio data can be after-recorded over the recorded data.

Since the DVD-RW records the title in accordance with the logical data structure which is the same as that of the DVD-Video, it is necessary to reproduce the recorded title to confirm whether the audio data can be after-recorded or not. Namely, the user must undergo a troublesome and time-consuming operation of operating the DVD recording and reproducing device, searching and reproducing the presentation data with a pickup thereof, and confirming the reproduced video information and audio information.

Thus there has been a demand for improving the operability at the after recording. Moreover, it is preferable to improve the operability not only of the after recording but also at addition and rewriting of information.

SUMMARY OF THE INVENTION

An object of the present invention is to provide a recording medium having a data structure suitable for improving the operability at addition and rewriting of recorded information.

According to the present invention, there is provided a recording medium comprising, a first recording area on which recording information is recorded, a second recording area on which management information for managing the recording information is recorded, wherein the second recording area includes a bit rate recording area that records a bit rate.

The recording information includes at least a video data and an audio data, the bit rate is a bit rate of the audio data.

The present invention further provides an apparatus for recording recording information on a recording medium comprising, recording means for recording a bit rate on the recording medium together with the recording information when the recording information is recorded.

The recording information includes at least a video data and an audio data, the bit rate is a bit rate of the audio data, and the recording medium includes a first recording area on which recording information is recorded and a second recording area on which management information for managing the recording information is recorded, the bit rate is recorded to the second recording area.

The present invention still further provides an apparatus for recording recording information on a recording medium comprising, recording system that records a bit rate on the recording medium together with the recording information when the recording information is recorded.

The recording information includes at least a video data and an audio data, the bit rate is a bit rate of the audio data, and the recording medium includes a first recording area on which recording information is recorded and a second recording area on which management information for managing the recording information is recorded, the bit rate is recorded to the second recording area.

The present invention further provides a method of recording recording information on a recording medium comprising, a recording step of recording a bit rate on the recording medium together with the recording information when the recording information is recorded.

The recording information includes at least a video data and an audio data, the bit rate is a bit rate of the audio data, and the recording medium includes a first recording area on which recording information is recorded and a second recording area on which management information for managing the recording information is recorded, the bit area is recorded to the second recording area.

These and other objects and features of the present invention will become more apparent from the following detailed description with reference to the accompanying drawings.

DETAILED DESCRIPTION OF THE PREFERRED EMBODIMENT

Figure 1:
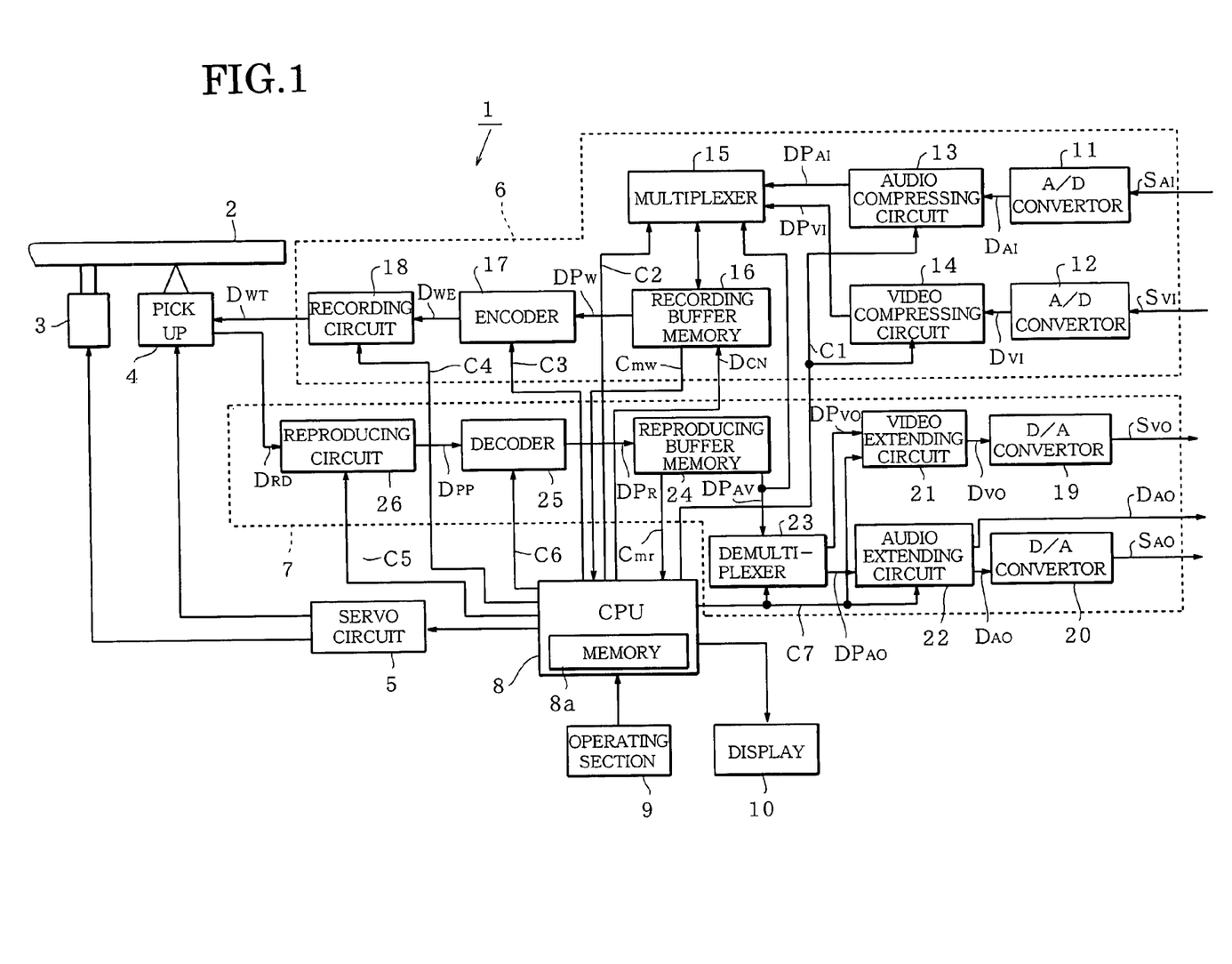
FIG. 1 is a block diagram showing a recording and reproducing system of the present invention.

Referring to FIG. 1, a recording and reproducing system 1 of the present invention comprises a spindle motor 3 for rotating a DVD-RW 2, pickup 4 for recording and reproducing information on and from the DVD-RW 2, servo circuit 5 for controlling the spindle motor 3 and pickup 4, recording system 6 for producing data to be recorded on the DVD-RW 2, reproducing system 7 for reproducing data recorded on the DVD-RW 2, central control circuit 8 for controlling the system 1, operating section 9 for instructing the central control system 8 to control the system by a user, and display 10.

The recording system 6 comprises an A/D converters 11 and 12, audio compressing circuit 13, video compressing circuit 14, multiplexer 15, recording buffer memory 16, encoder 17 and recording circuit 18.

The A/D converter 11 converts an input analog audio signal $S_{AI}$ to a digital audio data $D_{AI}$.

The audio compressing circuit 13 compresses the audio data $D_{AI}$ at a compression format designated by a control signal C1 applied from the central control circuit 8 to produce a compressed audio data $DP_{AI}$ which is fed to the multiplexer 15. In accordance with the present embodiment, the data are compressed in accordance with one of the linear PCM standard, AC-3 standard, and the MPEG audio standard, which is selected by operating the operating section 9.

The A/D converter 12 converts an input analog video signal $S_{VI}$ to a digital video data $D_{VI}$. The video compressing circuit 14 compresses the video data $D_{VI}$ to produce a compressed video data $DP_{VI}$ which is fed to the multiplexer 15. The data are compressed at the video compressing circuit 14 in accordance with the MPEG 2 video format (ISO 13818-2).

The multiplexer 15 multiplexes the compressed audio data $DP_{AI}$ with the compressed video data $DP_{VI}$ at a predetermined timing designated by a control signal C2 from the central control circuit 8 to produce a compressed data $DP_W$ which is time-shared.

When the user instructs the after recording, the multiplexer 15 is applied with compressed audio data $DP_{AI}$, compressed video data $DP_{VI}$ at the predetermined timing designated by the control signal C2 and a decoded data $DP_{AV}$ which will be described later in detail, so that the data are multiplexed, thereby generating the time-shared compressed data $DP_W$.

The recording buffer memory 16 temporarily stores the compressed audio data $DP_{AI}$, the compressed video data $DP_{VI}$ and the decoded data $DP_{AV}$ to produce the compressed data $DP_W$, cooperating with the mutiplexer 15. The compressed data $DP_W$ is fed to the encoder 17. Further, the recording buffer memory 16 applies a data quantity signal Cmw representing the length of the data to the central control circuit 8. A data quantity dependent on the data quantity signal Cmw is displayed on the display 10.

The encoder 17 encodes the compressed data $DP_W$ in accordance with a control signal C3 from the central control circuit 8 to produce an encoded data $D_{WE}$ which is fed to the recording circuit 18.

The recording circuit 18 power-amplifies the encoded data $D_{WE}$ in accordance with a control signal C4 from the central control circuit 8 to produce a recording data $D_{WT}$ which is applied to the pickup 4.

A semiconductor laser provided in the pickup is driven by the recording data $D_{WT}$ to emit a laser beam, so that the recording data $D_{WT}$ is recorded on the DVD-RW 2.

The reproducing system 7 comprises a D/A converter 19 and 20, video extending circuit 21, audio extending circuit 22, demultiplexer 23, reproducing buffer memory 24, decoder 25 and reproducing circuit 26.

The reproducing circuit 26 shapes the waveform of a detected signal $D_{RD}$ read out from the DVD-RW 2 by the pickup in accordance with a control signal C5 from the central control circuit 8 to produce a binary reproducing data $D_{PP}$ which is fed to decoder 25.

The decoder 25 decodes the reproducing data $D_{PP}$ based on a predetermined decode system corresponding to the encode system of the encoder 17 in accordance with a control signal C6 from the central control circuit 8 to produce a decoded data $DP_R$ which is applied to the reproducing buffer memory 24.

The buffer memory 24 temporarily stores the decoded data $DP_R$ and sends a data quantity signal Cmr representing the length of the decoded data $DP_R$ to the central control circuit 8. A data quantity of the decoded data $DP_R$ is displayed on the display 10. Furthermore, the reproducing memory 24 arranges the temporarily storing decoded data $DP_R$ into the decoded data $DP_{AV}$ in synchronism with a predetermined timing. The decoded data $DP_{AV}$ is fed to the demultiplexer 23.

As described above, when the user operates the operating portion 9 in order to instruct the central control circuit 8 to execute the after recording process, the decoded data $DV_{AV}$ are supplied to the multiplexer 15.

The demultiplexer 23 demultiplexes a compressed video data $DP_{VO}$ and a compressed audio data $DP_{AO}$ which are multiplexed in the decoded data $DP_{AV}$ in accordance with a control signal C7 from the central control circuit 8. The compressed video data $DP_{VO}$ supplied to the video extending circuit 21, and the compressed audio data $DP_{AO}$ is supplied to the audio extending circuit 22.

The video extending circuit 21 extends the compressed video data $DP_{VO}$ to produce an extended video data $D_{VO}$. The D/A converter 19 converts the video data $D_{VO}$ to produce an analog video signal $S_{VO}$.

The audio extending circuit 22 extends the compressed audio data $DP_{AO}$ to produce an extended audio data $D_{AO}$. The D/A converter 20 converts the audio data $D_{AO}$ to produce an analog audio signal $S_{AO}$. The digital audio data $D_{AO}$ generated at the audio extending circuit 22 is externally outputted.

The central control circuit 8 has a memory 8a storing a system program and others and a CPU for controlling the operation of the whole system.

Namely, the central control circuit 8 controls the operation of the servo circuit 5, the recording system 6, and the reproducing system 7, and displays menus indicating a manipulation method and others on the display 10.

Figure 2:
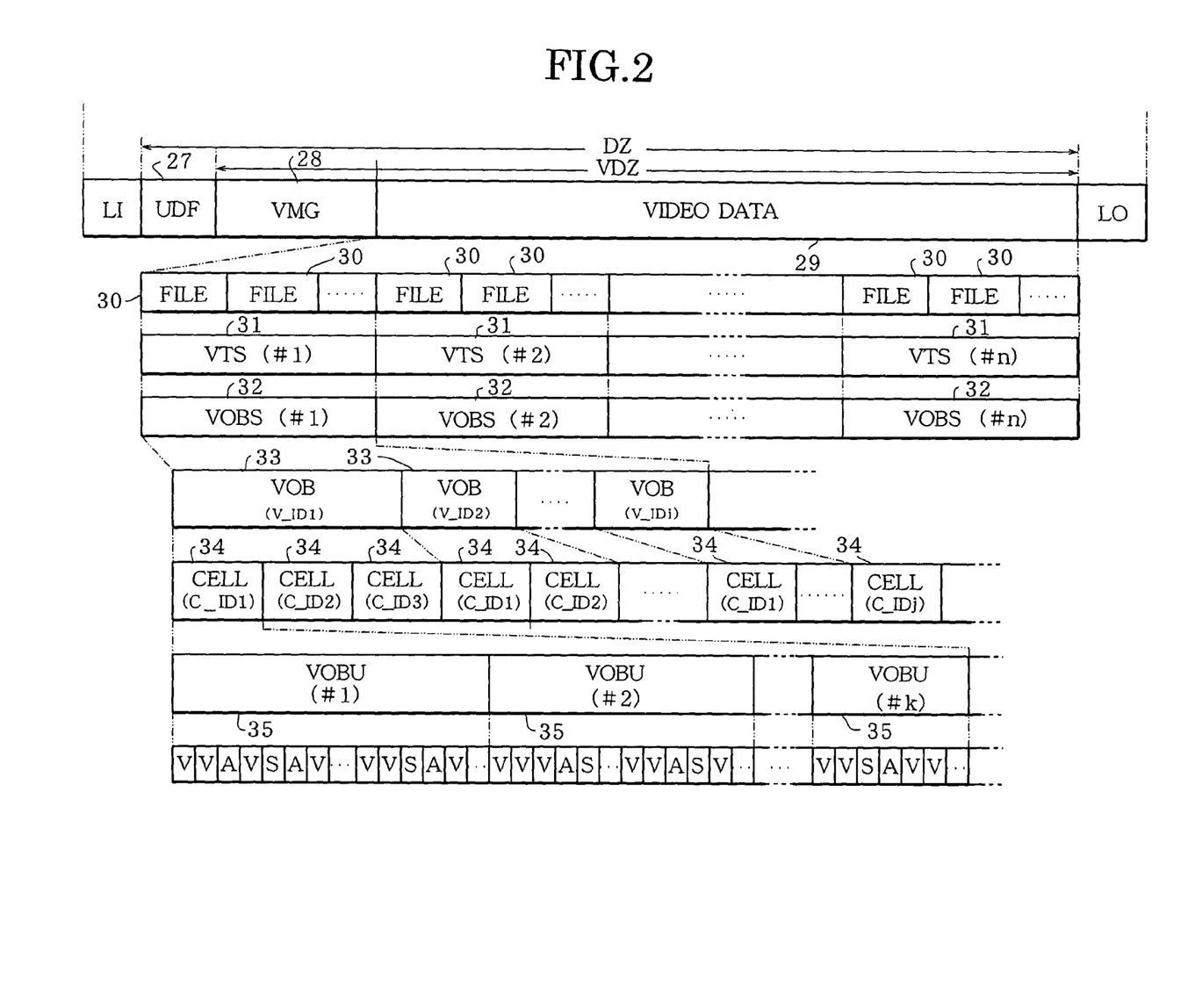
FIG. 2 is an illustration showing a structure of a logical data of a recording medium of the present invention.

FIG. 2 shows the whole logical data structure. The DVD-RW 2 comprises a lead-in area LI at the inner end portion of the disc, data recording area DZ and lead-out area LO.

The data recording area DZ comprises a UDF recording area 27 wherein a micro-Universal Disc Format (UDF) as a logical format representing the relationship between the physical address and the logical address is recorded, and a video data recording area VDZ.

The video data recording area VDZ comprises a video manager recording area 28 wherein a control data having a video manager information (VMGI) is recorded, and a recording area 29 wherein video data, audio data, and others are recorded.

In the video data recording area VDZ, data are recorded as a plurality of files 30 which are divided into a plurality of sets each of which comprises a plurality of files. Further, the sets are hierarchized.

The data recorded in the data recording area DZ roughly comprises the presentation data and navigation data. The presentation data has video data, audio data, and subpicture data packaged into packs and integrated with predetermined navigation data in accordance with the MPEG 2 standard (ISO 13818-1).

As an uppermost order recording unit, there is provided video title sets (VTS: Video Title Set) 31 from #1 to #n wherein a video title can be recorded. Each video title set is combined with a video object set (VOBS: Video Object Set) 32.

Each video object set 32 comprises one or more video object (VOB) 33 and is identified by an ID number (V-ID1~V-IDi).

Each video object 33 comprises one or more cell (CELL) 34, and each cell 34 comprises one or more video object unit (VOBU) 35. Each cell 34 is identified by an ID number (C-ID1 ~C-IDj).

Each video object unit (VOBU) 35 comprises one or more video pack V, audio pack A and subpicture pack S.

Namely, the presentation data comprising the video pack V, audio pack A and the subpicture pack S are assigned to video object unit (VOBU) 35, cell (CELL) 34, video object (VOB) 33, video object set (VOBS) 32 and video title set (VTS) 31 so as to be managed.

Figure 3:
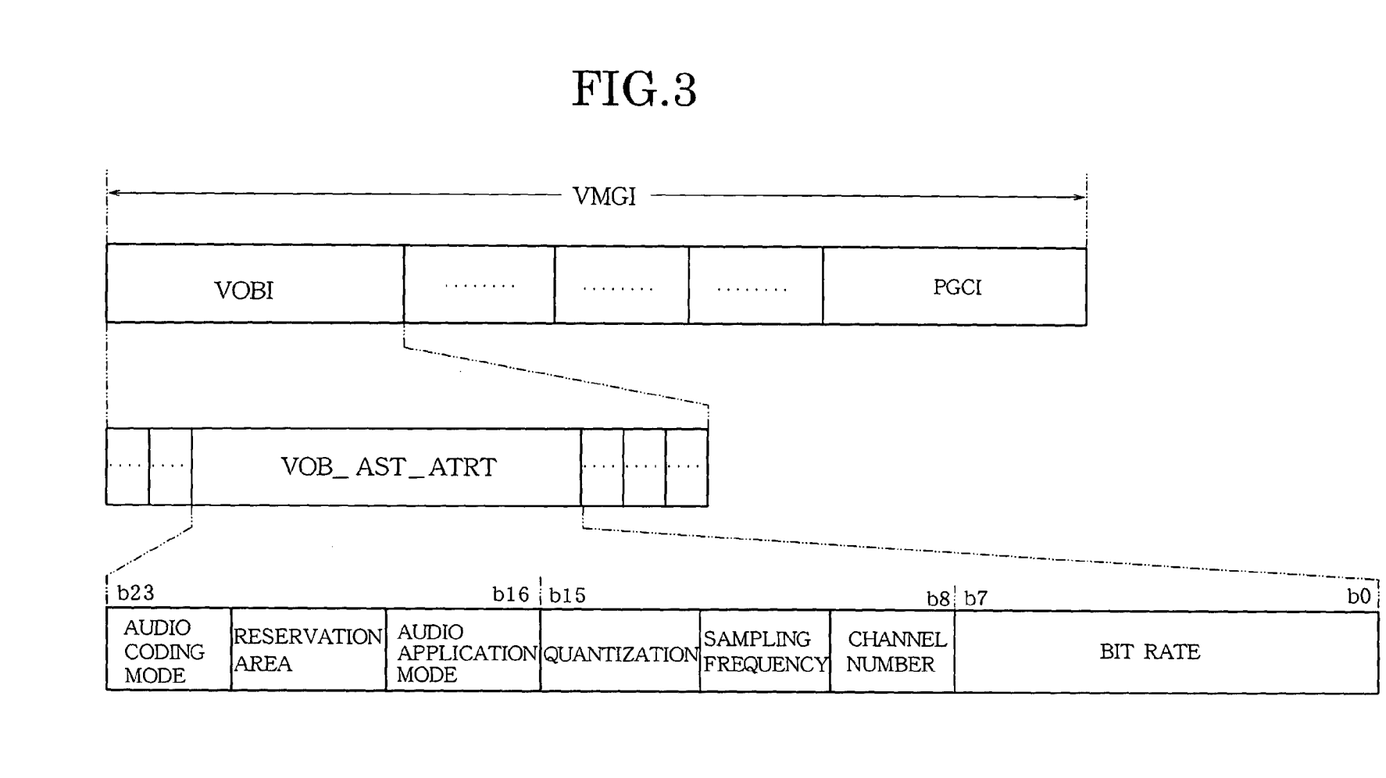
FIG. 3 shows video management information.

Referring to FIG. 3, in the video manager recording area 28, video manager information (VMGI) including at least the program chain information (PGCI) and video object information (VOBI) is recorded.

The video object information is information relative to the attribute of each video object and the data length.

The program chain information (PGCI) is provided with information indicating reproducing order of the presentation data, which is assigned at the video title sets VTS(#1)~VTS (#n).

The video manager information (VMGI) is a management data for recording and reproducing the video title sets VTS (#1)~VTS(#n). In the program chain information (PGCI), the information regarding the reproducing order of the presentation data is recorded as the information regarding the order of the cells (CELL). The video object information (VOBI) is a table for recording the attribute and the data length of the presentation data for each unit of video object (VOB).

One of the items in the video object information (VOBI) is an audio stream attribute table (VOB-AST-ATRT) for writing the attribute of the audio pack A included in the video object (VOB).

The audio stream attribute table (VOB-AST-ATRT) comprises three bytes and stores information on audio coding mode, audio application mode, quantization Qb, sampling frequency fs, number CHn of audio channel, and bit rate.

The audio coding mode indicates which of the MPEG audio, AC-3 and linear PCM compressing standards is used for the audio pack A. In the audio application mode, a flag related to the audio attribute of the video object (VOB) is recorded.

Namely, the information recorded in the audio stream attribute table (VOB-AST-ATRT) represents the quality of the audio stream recorded on the DVD-RW 2. Upon reproduction, the information recorded in the audio stream attribute table (VOB-AST-ATRT) is reproduced and shown on the display 10 so as to indicate the user the quality of the recorded audio stream.

Figure 4:
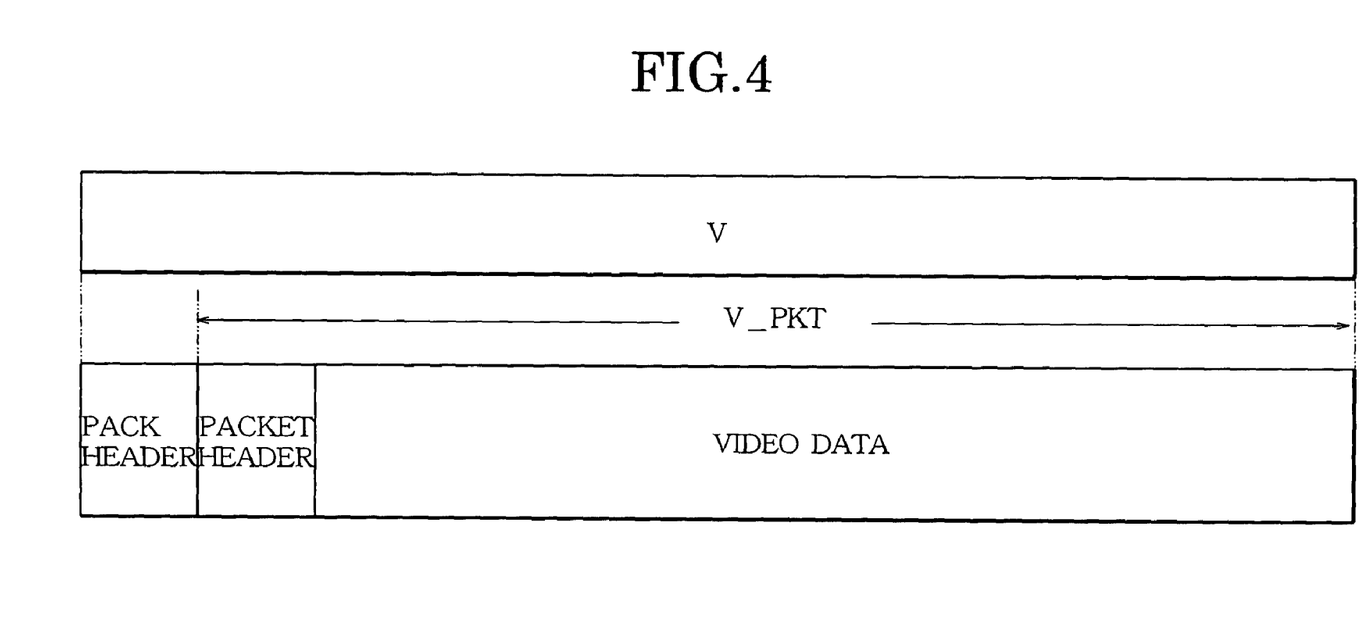
FIG. 4 shows a video pack.

Referring to FIG. 4, a pack header, packet header and video data are recorded in the video pack V.

Figure 5:
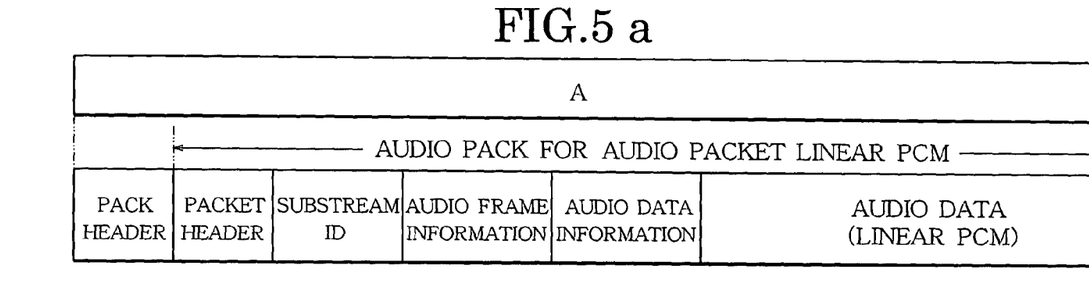
FIGS. 5a to 5c show audio packs.

In the audio pack A, audio data are variously recorded in accordance with the difference of the compression system as shown in FIGS. 5a, 5b and 5c.

The operation of the after recording the DVD-RW 2 using the recording and reproducing system 1 is described hereinafter with reference to FIGS. 6 and 7. The operation is controlled by the microcomputer (CPU) provided in the central control circuit 8.

Figure 6:
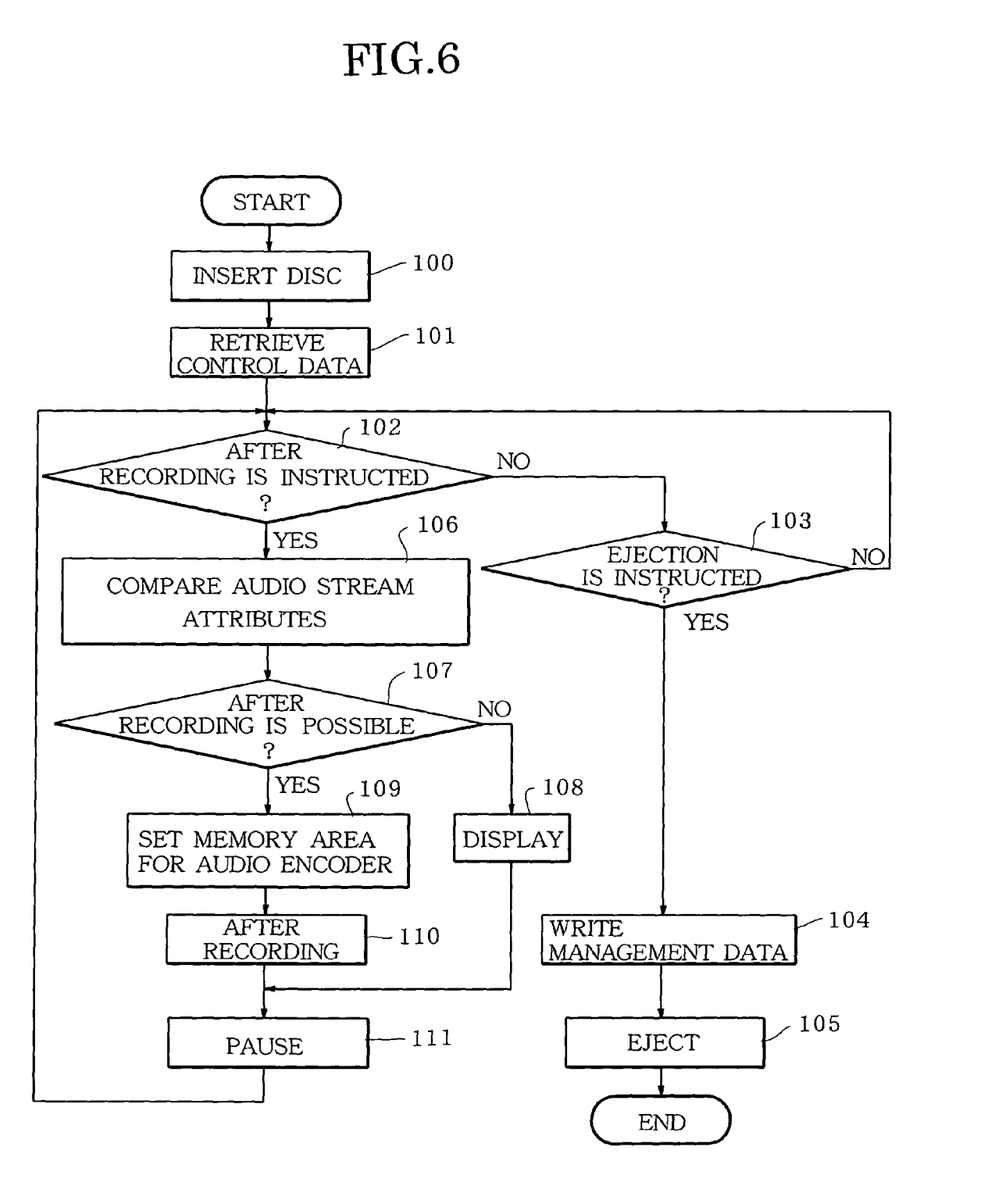
FIGS. 6 and 7 show flowcharts of operation of the system of the present invention.

Referring to FIG. 6, when it is detected that the DVD-RW 2 is inserted at a step 100, at a step 101, the information thereof is read out by the pickup 4 to retrieve the control data necessary for reproduction. When it is determined at a step 102 that the user did not instruct the after recording, the program goes to a step 103 wherein it is further determined whether the ejection of the disc is instructed. When NO, the program returns to the step 102. On the other hand, when the ejection is instructed, the necessary management data is recorded on the DVD-RW 2 at a step 104, and the DVD-RW 2 is ejected at a step 105.

When the after recording is instructed at the step 102, the data in the audio stream attribute table (VOB-AST-ATRT) included in the control data retrieved at the step 101 is checked at a step 106. Namely, the bit rate and the data of the audio coding mode already recorded in the audio stream attribute table (VOB-AST-ATRT) are compared with the bit rate and the data of the audio coding mode of the audio data which the user intends to record at the after recording.

At a step 107, it is determined whether the bit rate of the audio data for the after recording is in compliance with that of the audio data already recorded based on the comparison. If the bit rates do not comply with each other, it is determined at the step 107 that the after recording is not possible and the program proceeds to a step 108. At the step 108, an indication to the effect that the after recording cannot be performed is shown on the display 10. Thereafter, the program returns to the step 102 after a pause at a step 111, thereby awaiting the next instruction by the user.

When it is possible to after-record, the program proceeds from the step 107 to a step 109 where a recording area for an audio encoder is set in the recording buffer memory 16. Thereafter, the after recording is carried out at a step 110.

Figure 7:
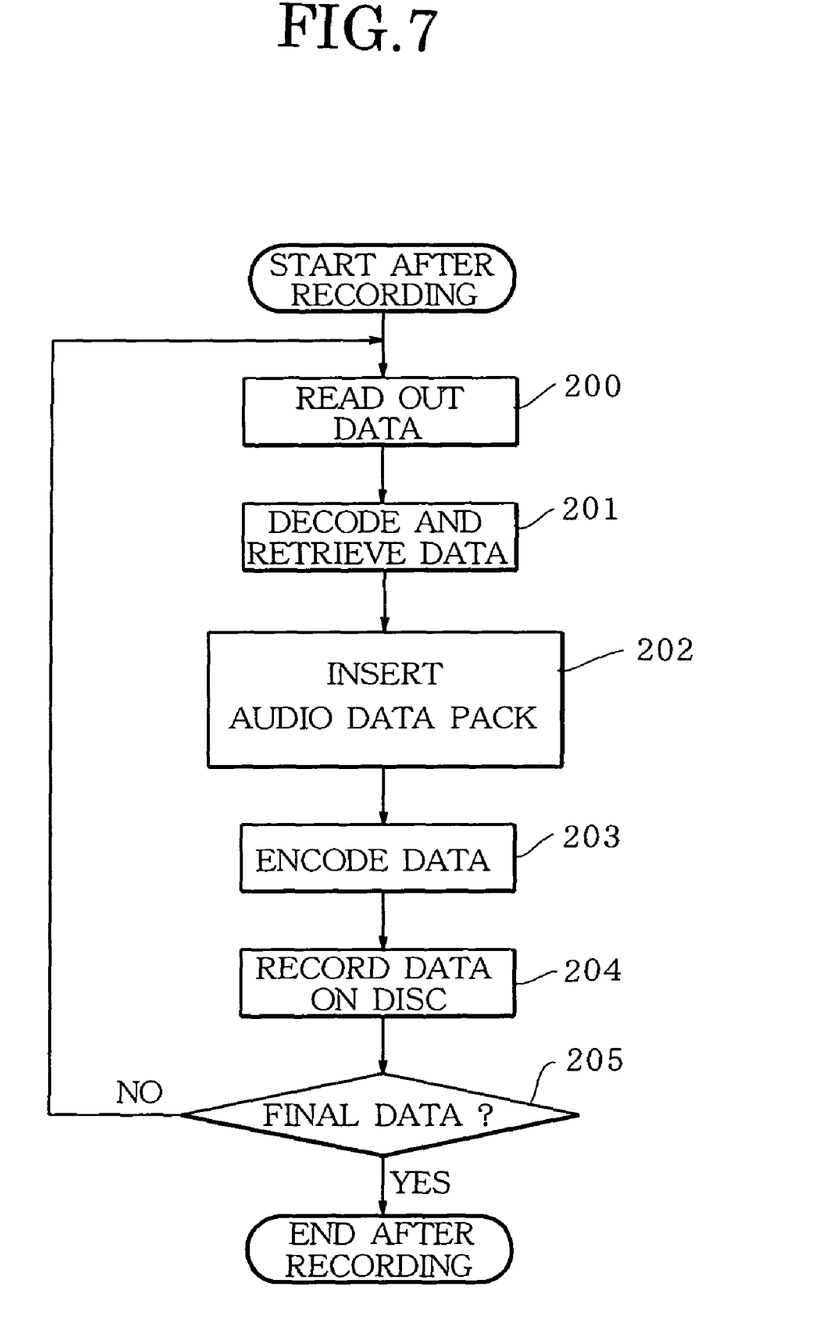

The process of the after recording is described in detail in FIG. 7. At steps 200 and 201, the pickup 4 reads out the data from the DVD-RW 2, and the read out data are applied to the reproducing circuit 26, decoder 25, and reproducing buffer memory 24, thereby decoded. The decoded data $DP_{AV}$ are supplied to the multiplexer 15.

At a step 202, the multiplexer 15 multiplexes the compressed audio data $DP_{AI}$ which is the audio data for after recording, with the decoded data $DP_{AV}$ in accordance with the control signal C2 from the central control circuit 8. The data in the video pack and subpicture pack of the decoded data $DP_{AV}$ remain unchanged while the compressed audio data $DP_{AI}$ is recorded in the audio data pack. The recording is carried out in the unit of the error correction code (ECC) provided for the error correction.

Thus the data $DP_{AO}$ on the audio information included in the decoded data $DP_{AV}$ is exchanged for the after recording audio data $DP_{AI}$. The multiplexed compressed data $D_{PW}$ is thus generated from the recording buffer memory 16. At steps 203 and 204, the multiplexed compressed data $D_{PW}$ is applied to the pickup 4 through the encoder 17 and the recording circuit 18 so as to write the data on the DVD-RW 2.

The steps 200 to 204 are repeated until it is determined at a step 205 that all of the after recording audio data $DP_{AI}$ is recorded on the DVD-RW 2. When the after recording is completed, the program goes to the step 111, and thereafter to the step 102 in FIG. 6.

Thus in the present embodiment, since the bit rate information is recorded in the audio stream attribute table (VOB-AST-ATRT) in the video object information (VOBI), by retrieving the bit rate information, the data length of the already recorded audio data and that of the after recording audio data can be compared with each other. Thus it can be easily checked whether the after recording can be executed or not.

Whereas with the conventional recording medium, it is necessary to confirm the stream of the recorded audio data at the after recording, thereby necessitating a troublesome operation, in accordance with the present invention, such an operation is not needed so that the operability is improved.

The operability is improved also when adding or rewriting information.

While the invention has been described in conjunction with preferred specific embodiment thereof, it will be understood that this description is intended to illustrate and not limit the scope of the invention, which is defined by the following claims.

What is claimed is:

1. An apparatus for recording recording information on a recording medium comprising:
   recording means for recording a bit rate on the recording medium together with the recording information when the recording information is recorded;
   reproducing means for reproducing the recorded bit rate of the recording information together with the recording information when the recorded recording information is reproduced; and
   control means for determining whether a renewal recording or addition recording is possible based on the bit rate and a bit rate of new recording information when the new recording information is recorded for renewal or addition, and for starting the renewal recording or the addition recording when the renewal recording or the addition recording is possible.

2. An apparatus for recording recording information on a recording medium comprising:
   recording system that records a bit rate on the recording medium together with the recording information when the recording information is recorded;
   reproducing system that reproduces the recorded bit rate of the recording information together with the recording information when the recorded recording information is reproduced; and
   control system that determines whether a renewal recording or addition recording is possible based on the bit rate and a bit rate of new recording information when the new recording information is recorded for renewal or addition, and that starts the renewal recording or the addition recording when the renewal recording or the addition recording is possible.

3. A method of recording recording information on a recording medium comprising:
   a recording step of recording a bit rate on the recording medium together with the recording information when the recording information is recorded;
   a reproducing step of reproducing the recorded bit rate of the recording information together with the recording information when the recorded recording information is reproduced;
   a step of determining whether a renewal recording or addition recording is possible based on the bit rate and a bit rate of new recording information when the new recording information is recorded for renewal or addition; and
   a step of starting the renewal recording or the addition recording when the renewal recording or the addition recording is possible.

* * * * *